United States Patent
Wu

(10) Patent No.: US 8,351,690 B2
(45) Date of Patent: Jan. 8, 2013

(54) SYSTEM AND METHOD FOR DETECTING BLACK BARS IN ELECTRONIC IMAGE

(75) Inventor: Wen-Yi Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 607 days.

(21) Appl. No.: 12/617,952

(22) Filed: Nov. 13, 2009

(65) Prior Publication Data

US 2011/0026822 A1 Feb. 3, 2011

(30) Foreign Application Priority Data

Jul. 29, 2009 (CN) .......................... 2009 1 0304970

(51) Int. Cl.
*G06K 9/00* (2006.01)
*H04N 5/46* (2006.01)
(52) U.S. Cl. ................... 382/165; 382/103; 348/558
(58) Field of Classification Search ............... 382/165, 382/103; 348/558
See application file for complete search history.

(56) References Cited

U.S. PATENT DOCUMENTS

| | | | | |
|---|---|---|---|---|
| 5,258,854 A * | 11/1993 | Eschbach | ................... | 358/445 |
| 5,317,427 A * | 5/1994 | Ichikawa | ................... | 358/520 |
| 5,760,840 A * | 6/1998 | Tani et al. | ................... | 348/558 |
| 6,069,981 A * | 5/2000 | Murakami | ................... | 382/274 |
| 6,366,706 B1 * | 4/2002 | Weitbruch | ................... | 382/254 |
| 6,947,097 B1 * | 9/2005 | Joanblanq | ................... | 348/558 |
| 7,161,616 B1 * | 1/2007 | Okamoto et al. | ............. | 348/148 |
| 7,466,340 B1 * | 12/2008 | Herz | ................... | 348/173 |
| 7,936,944 B2 * | 5/2011 | Sato et al. | ................... | 382/274 |
| 2001/0005431 A1 * | 6/2001 | Mori | ................... | 382/199 |
| 2004/0165064 A1 * | 8/2004 | Weitbruch et al. | ........... | 348/173 |
| 2005/0031201 A1 * | 2/2005 | Goh | ................... | 382/169 |
| 2005/0083419 A1 * | 4/2005 | Honda et al. | ................ | 348/244 |
| 2005/0094033 A1 * | 5/2005 | Schoner et al. | ............ | 348/558 |
| 2006/0146190 A1 * | 7/2006 | Ahn et al. | ................ | 348/458 |
| 2007/0247518 A1 * | 10/2007 | Thomas et al. | ............... | 348/36 |
| 2007/0297669 A1 * | 12/2007 | Neal | ................... | 382/168 |
| 2008/0247665 A1 * | 10/2008 | Hsu | ................... | 382/274 |
| 2008/0263432 A1 * | 10/2008 | Newcomb et al. | ........... | 715/200 |
| 2009/0238408 A1 * | 9/2009 | Ikeda et al. | ................ | 382/103 |
| 2010/0182450 A1 * | 7/2010 | Kumar et al. | ............. | 348/229.1 |
| 2011/0188836 A1 * | 8/2011 | Popkiewicz et al. | .......... | 386/278 |

* cited by examiner

*Primary Examiner* — Wenpeng Chen
(74) *Attorney, Agent, or Firm* — Altis Law Group, Inc.

(57) ABSTRACT

A testing method includes following steps. An electronic image is captured by an electronic device. A test device detect whether the image has any black bar. If the image has a black bar, pixel values in the black bar are extracted. If the pixel values in the black bar are all the same, a test result of imaging software error is presented. If the pixel values in the black bar are different from each other, a test result of mechanism error is presented. A test system associated with the testing method is also disclosed.

11 Claims, 3 Drawing Sheets

SYSTEM AND METHOD FOR DETECTING BLACK BARS IN ELECTRONIC IMAGE

BACKGROUND

1. Technical Field

The present disclosure relates to a system and method for detecting whether an image captured by an electronic device has black bars.

2. Description of Related Art

In recent years, more and more electronic devices, e.g., digital camera, mobile phone, personal digital assistant, notebook computer, have capabilities to capture images. It's a necessary step to detect whether an annoying black edge (also called black bar) is present in the images. One reason that causes the black bar is mechanism error, for example, a camera lens of the electronic device partially covered by others parts of the electronic device will cause the black bar. Another reason is that the imaging software of the electronic device is error.

If the black bar is caused due to the mechanism error, RGB (Red-Green-Blue) pixel values in the black bar are in proximity of RGB(0, 0, 0). RGB(0,0,0) is black. In additional, the pixel values in the black bar are not different from each other.

If the black bar is caused due to the imaging software error, RGB (Red-Green-Blue) pixel values in the black bar are in proximity of RGB(0, 0, 0), and the pixel values in the black bar are equal to each other.

However, typical test systems and methods can not both detect whether the black bar is presented and present what reason causes the black bar.

Therefore, a system and method capable of both detecting whether the black bar is presented and presenting what reason causes the black bar is desired.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
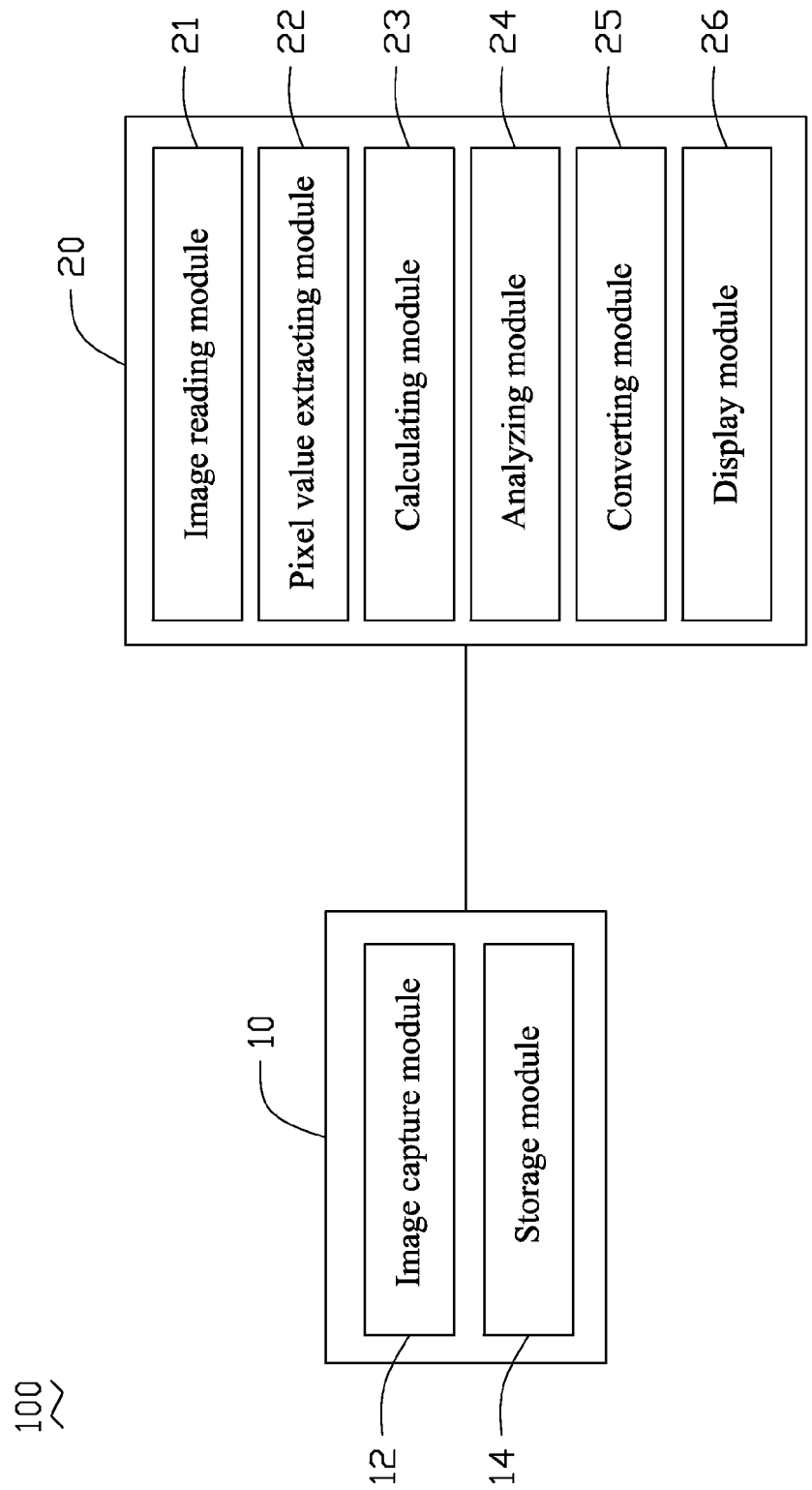
FIG. 1 is an embodiment of a block diagram of a system for detecting black bar in an image.

Referring to FIG. 1, an embodiment of a testing system 100 includes an electronic device 10 and a test device 20. The electronic device 10 includes an image capture module 12 capable of capturing an electronic image and a storage module 14 configured to store the image. The test device 20 is configured to detect whether the electronic image captured by the electronic device 10 contains any black bar and determine an underlying cause of the black bar. In an embodiment, the image captured by the image capture module 12 of the electronic device 10 is in RGB (Red-Green-Blue) format.

The test device 20 includes an image reading module 21, a pixel value extracting module 22, a calculating module 23, an analyzing module 24, a converting module 25, and a display module 26. The image reading module 21 is configured to read the image from the electronic device 10. The pixel value extracting module 22 is capable of extracting RGB pixel values of the image. The calculating module 23 is capable of processing the pixel values and calculating an associated grey value of each of the RGB pixel values. The analyzing module 24 is capable of analyzing the grey values to determine whether the image has any black bars and determine the cause of the black bars. The converting module 25 is configured to convert the RGB image into a grey image. The display module 26 is capable of displaying the image read from the electronic device 10 and test results.

Figure 2:
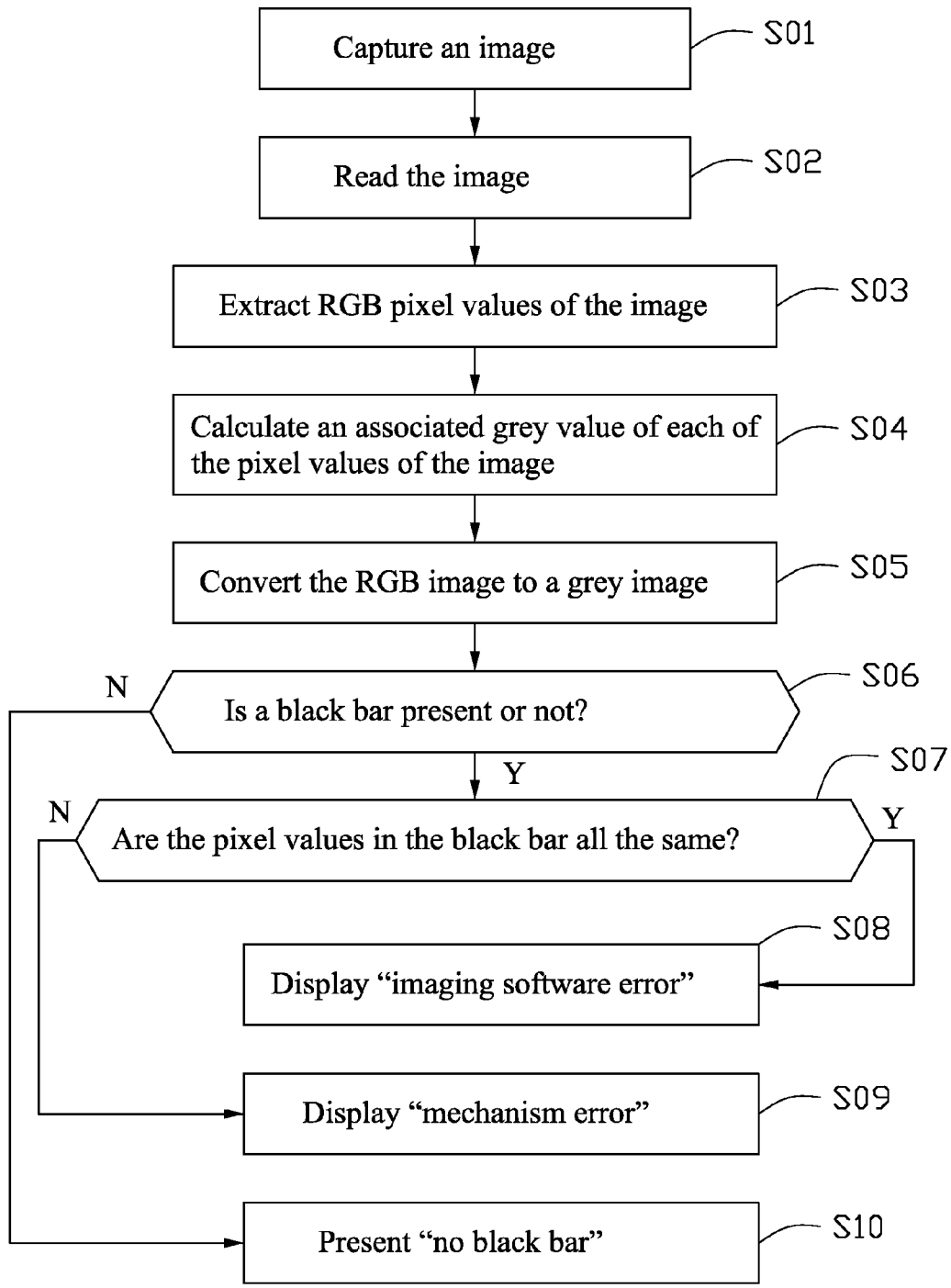
FIG. 2 is an embodiment of a flow chart of a method for detecting black bar in an image.

Referring to FIG. 2, an embodiment of testing method associated with the testing system 100 is shown.

In block S01, the image capture module 12 of the electronic device 10 captures an image (in RGB format). The storage module 14 of the electronic device 10 stores the image. In this block, a soft light source used for testing cameras is prepared, and the image capture module 12 can capture an image of the light source. Thus the image should be bright and have no black bars if the image capturing function of the electronic device 10 is qualified.

In block S02, the image reading module 21 of the test device 20 reads the image from the storage module 14 of the electronic device 10.

In block S03, the pixel value extracting module 22 of the test device 20 extracts RGB values of all pixels in the image.

In block S04, the calculating module 23 of the test device calculates an associated grey value of each of the pixel values of the image.

In block S05, the converting module 25 converts the image in RGB format to grey format.

In block S06, whether a black bar is present in the image is detected.

In block S07, if a black bar is detected in the image, the analyzing module 24 compares the pixel values in the black bar with each other to determine whether the pixel values of the black bar are equal to each other.

In block S08, if the pixel values in the black bar are all the same, the display module 26 displays a test result of "imaging software error" to indicate that the black bar is caused by imaging software error. Thus, imaging software of the electronic device 10 should be checked and repaired.

In block S09, if the pixel values in the black bar are different from each other, the display module 26 displays a test result of "mechanism error" to show that the black bar is caused by mechanism error. Thus, mechanism of the electronic device 10 should be checked and repaired.

In block S10, if there is not any black bar presented in the image, the display module 26 presents a test result of "no black bar".

Figure 3:
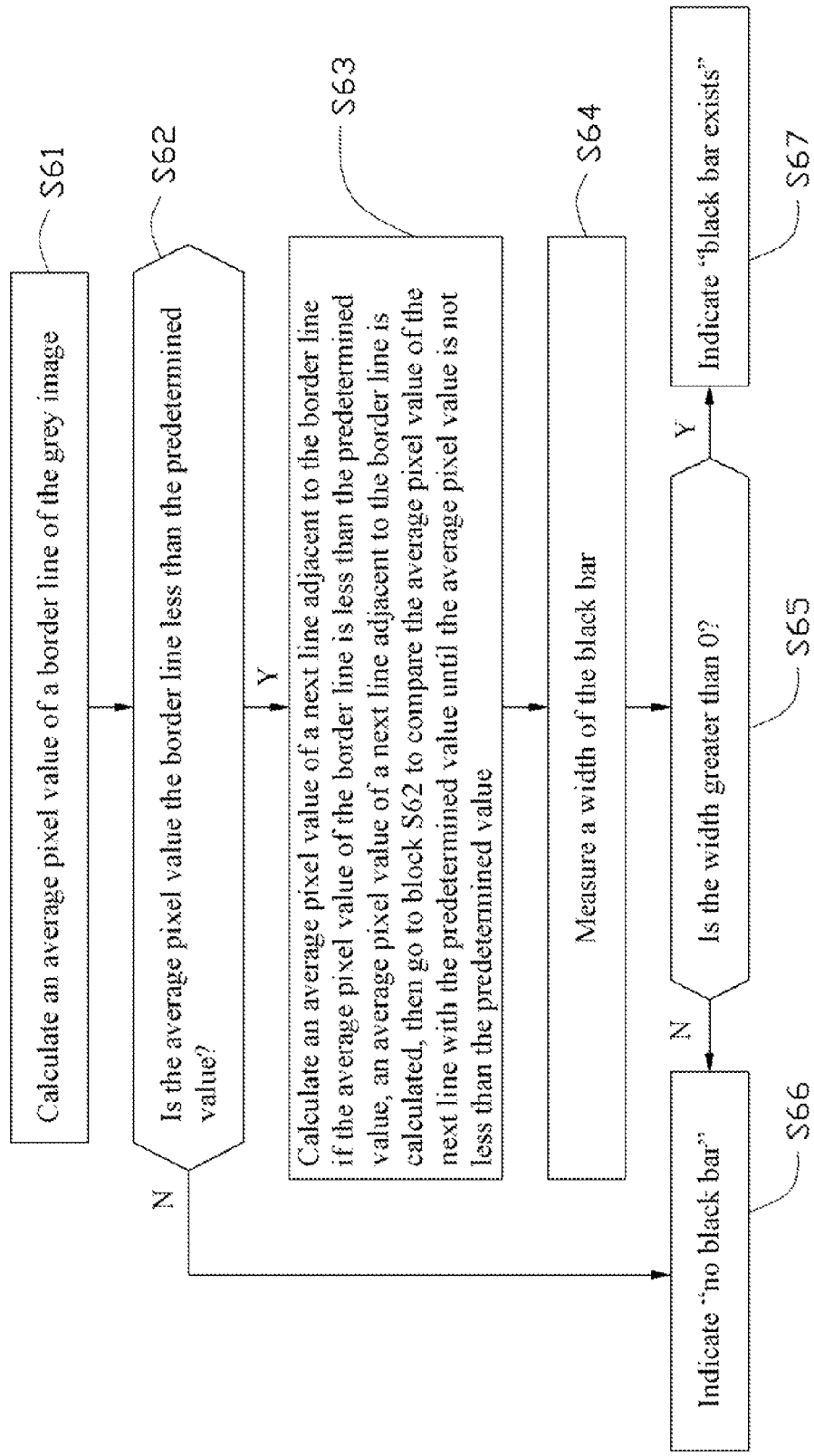
FIG. 3 is a flow chart of a block S06 of the embodiment shown in FIG. 2.

Referring to FIG. 3, the block S06 described above further includes following blocks.

In block S61, an average pixel value of each border line (left, right, top, or bottom edge) of the grey image is calculated by the calculating module 23.

In block S62, the average pixel value is compared with a predetermined value to determine whether the average pixel value the border line is less than the predetermined value. The predetermined value is slightly greater than 0. As known to those skilled in the art, 0 to 255 represent a gray scale ranging from black to white.

In block S63, if the average pixel value the border line is less than the predetermined value, an average pixel value of a next line adjacent to the border line is calculated, then go to block S62 to compare the average pixel value of the next line with the predetermined value until the average pixel value is not less than the predetermined value.

In block S64, a width of the black bar is measured.

In block S65, whether the width of the black bar is greater than 0 is determined.

In block S66, if the width of the black bar equals 0, "no black bar" is indicated.

In block S67, if the width is greater than 0, "black bar exists" is indicated.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

Depending on the embodiment, certain of the steps described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for detecting black bars in an electronic image captured by an electronic device, the method comprising steps of:
    reading the electronic image from the electronic device;
    detecting whether the image has any black bar;
    if the image has a black bar, extracting pixel values in the black bar; and
    if the pixel values in the black bar are all the same, outputting a test result indicating an imaging software error;
    if the pixel values in the black bar are different from each other, outputting a test result indicating a mechanism error.

2. The method of claim 1, wherein the step of detecting whether the image has any black bar comprises calculating an average pixel value of a border line of the image and comparing the average pixel value of the border line with a predetermined value.

3. The method of claim 2, wherein the step of detecting whether the image has any black bar further comprises calculating an average pixel value of a line adjacent to the border line for defining a boundary of the black bar.

4. The method of claim 3, further comprising measuring a width of the black bar if the average pixel value of the next line of the image is greater than the predetermined value.

5. The method of claim 1, wherein the image is a RGB image, and the pixel values are RGB values.

6. The method of claim 5, further comprising converting the RGB values into grey values and converting the RGB image into grayscale.

7. A system for detecting black bars in an electronic image, the system comprising a testing device and an electronic device, the testing device comprising:
    an image reading module configured to read the electronic image captured by the electronic device;
    a pixel value extracting module configured to extract pixel values of a border of the electronic image;
    an analyzing module configured to analyze the pixel values to determine whether the electronic image has any black bar at the border and what reason causes the black bar; and
    a result display module configured to display a first test result to indicate an imaging software error if the pixel values in a detected black bar are all the same.

8. The system of claim 7, wherein the testing device further comprises a calculating module configured to calculate an average pixel value of the border, the analyzing module is configured to compare the average pixel value of the border with a predetermined value to determine whether the border of the image has a black bar.

9. The system of claim 8, wherein the image is in RGB format; the pixel values are RGB values; the calculating module is configured to calculate a correlated grey value of each of the RGB pixel values.

10. The system of claim 9, wherein the testing device further comprises a converting module configured to convert the image in RGB format into a grey format.

11. The system of claim 7, wherein the result display module is configured to display a second test result indicate a mechanism error if the pixel values in the detected black bar are different, from each other.

* * * * *